Jan. 22, 1963    Z. TAKATS    3,074,467
APPARATUS FOR SPLICING FILM
Filed Dec. 8, 1958    4 Sheets-Sheet 1

INVENTOR
ZOLTAN TAKATS

BY *Henry W Coughlin*
*Frederick A Sutter*
ATTORNEYS

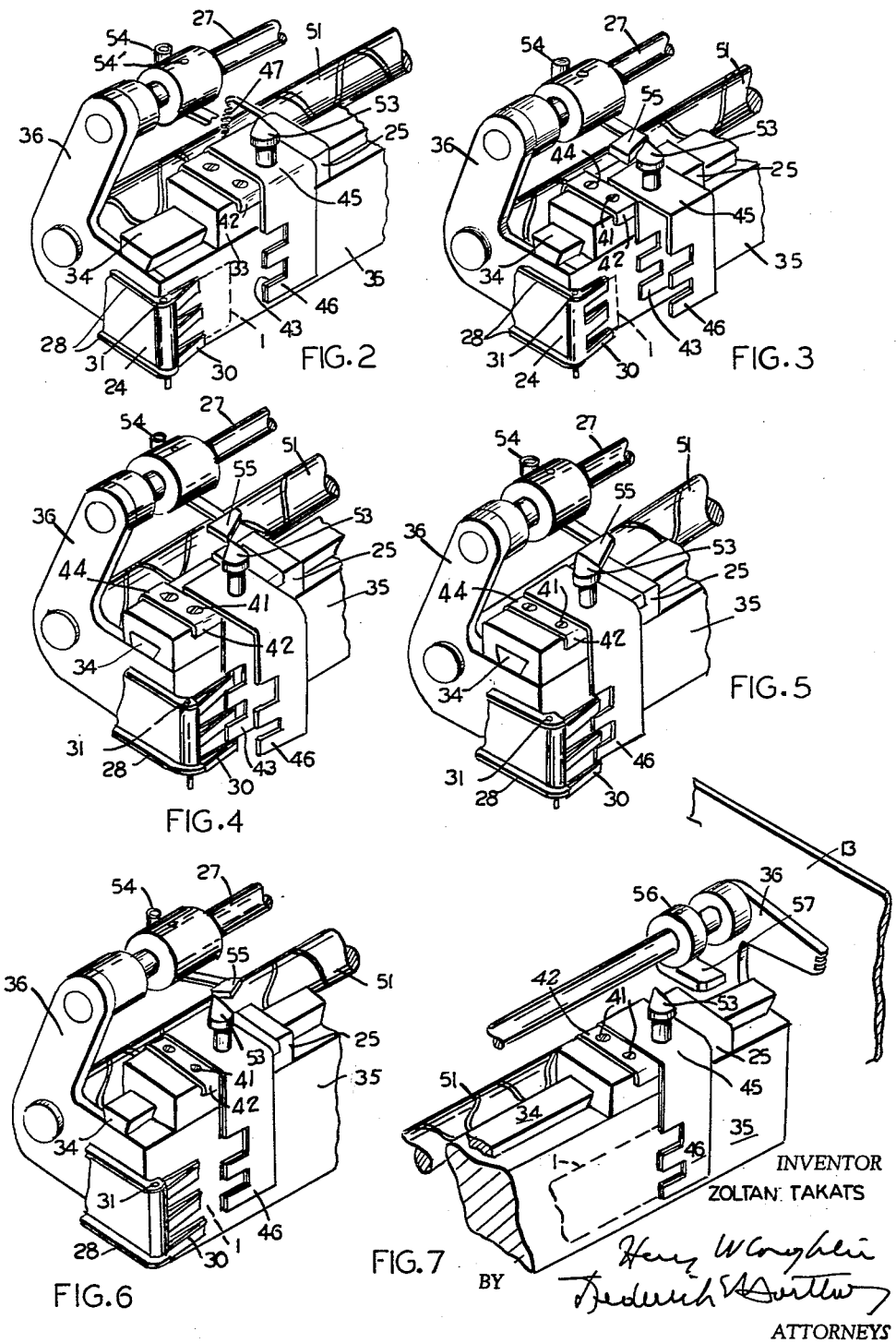

Jan. 22, 1963  Z. TAKATS  3,074,467
APPARATUS FOR SPLICING FILM
Filed Dec. 8, 1958  4 Sheets-Sheet 3
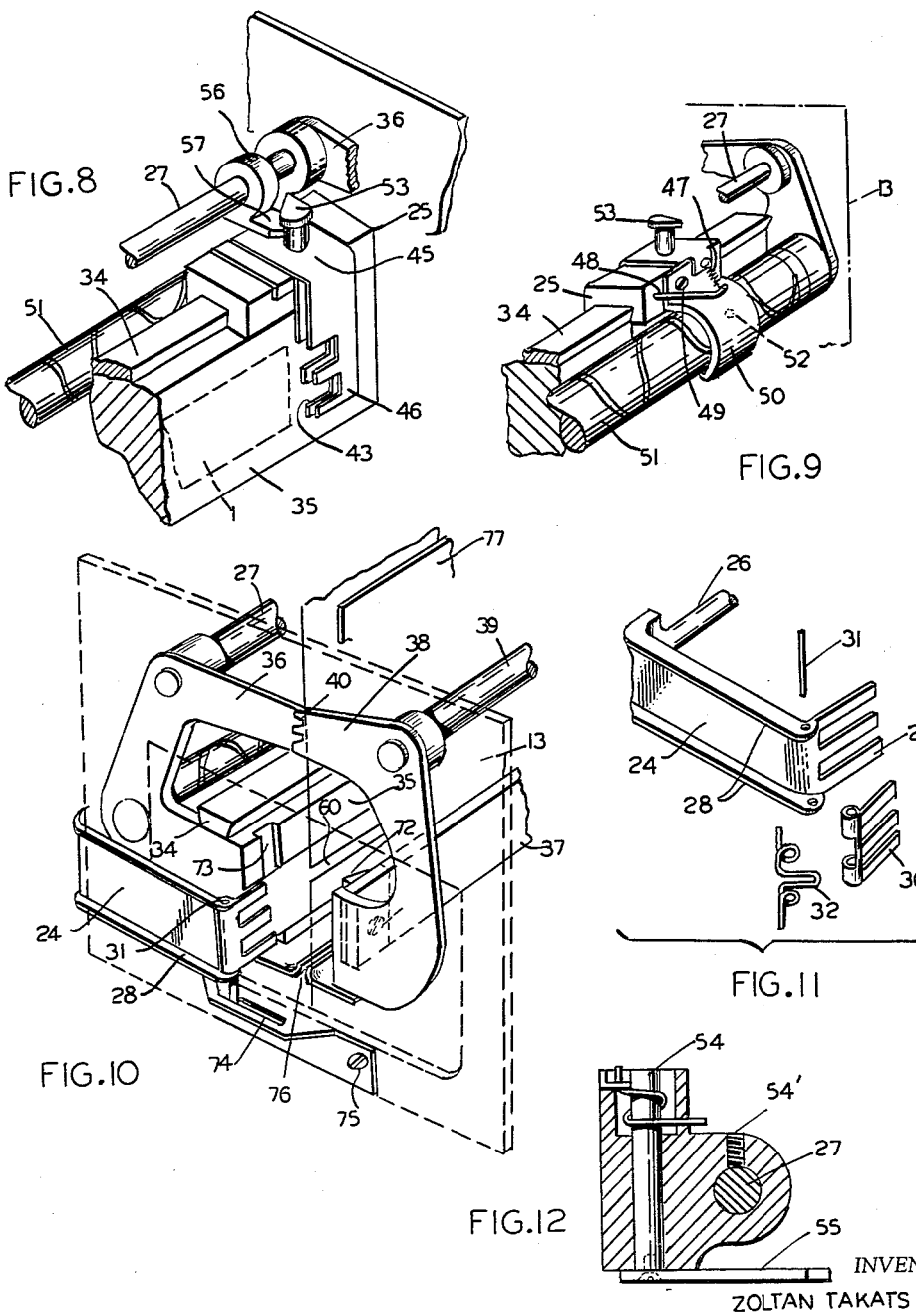
INVENTOR
ZOLTAN TAKATS Jan. 22, 1963    Z. TAKATS    3,074,467
APPARATUS FOR SPLICING FILM
Filed Dec. 8, 1958    4 Sheets-Sheet 4

INVENTOR
ZOLTAN TAKATS

BY

ATTORNEYS

United States Patent Office 3,074,467
Patented Jan. 22, 1963

3,074,467
APPARATUS FOR SPLICING FILM
Zoltan Takats, Vestal, N.Y., assignor to General Aniline & Film Corporation, New York, N.Y., a corporation of Delaware
Filed Dec. 8, 1958, Ser. No. 779,272
5 Claims. (Cl. 156—505)

This invention relates to an apparatus for splicing film. More particularly, this invention relates to an apparatus whereby individual sheets of exposed photographic film stored in a hopper are removed therefrom and spliced together.

In U.S. application, Serial No. 762,514 filed September 22, 1958 there is disclosed an aerial camera wherein a continuous film is moved off a roll and past the lens of the camera where it is exposed and the exposed film is thereafter cut into individual sheets and the sheets stored in a hopper. The apparatus of this invention is especially designed to cooperate with the apparatus disclosed in the above mentioned application to remove the individual sheets from the hopper and splice them together.

It is an object of this invention to provide a novel apparatus for splicing film.

It is a further object of this invention to provide a novel apparatus for splicing film which is light and compact and may be placed in an airplane in association with an aerial camera.

It is a still further object of this invention to provide a novel apparatus for removing individual sheets of film from a storage hopper and splicing them together.

Figure 1:
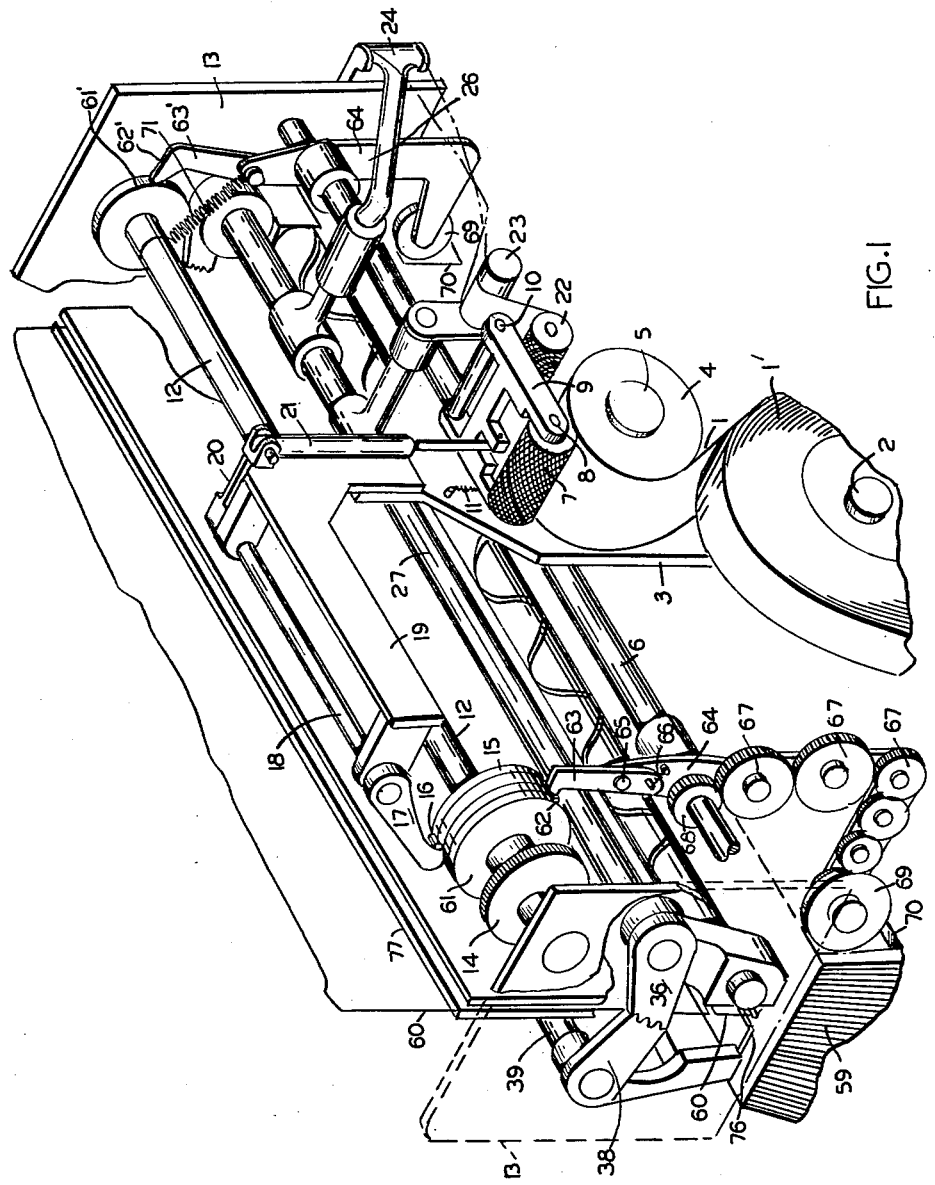
Figures 13, 14:
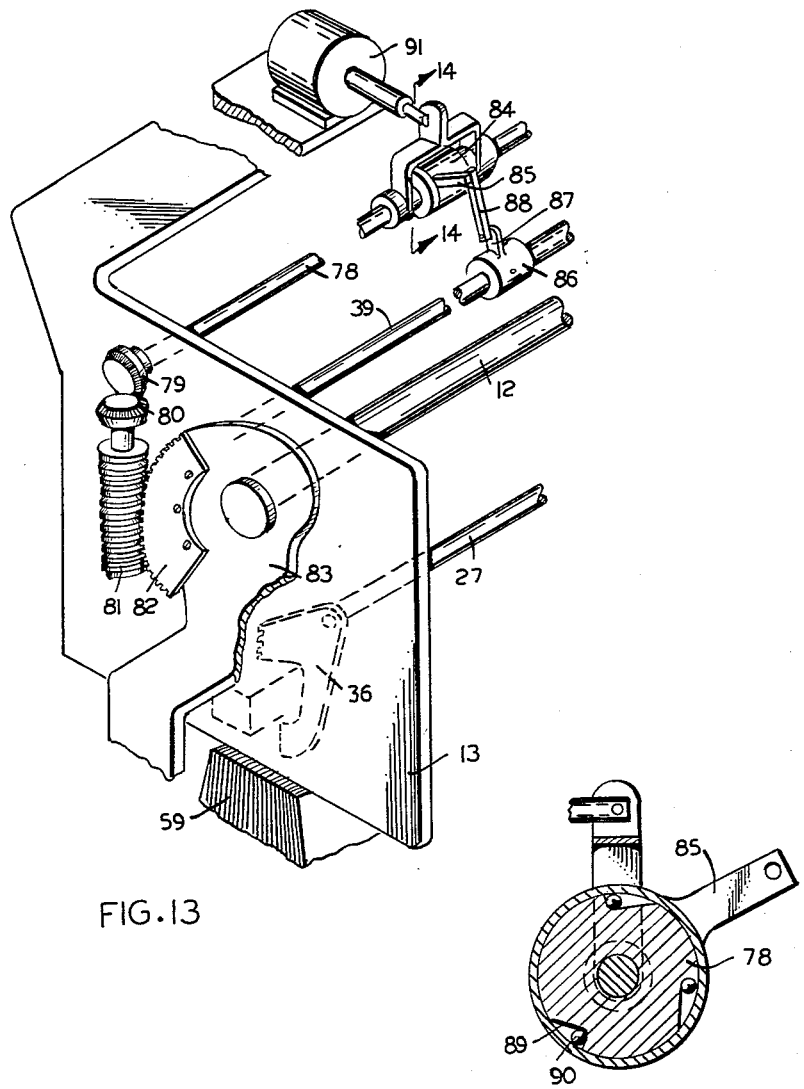

Other objects and advantages will be apparent from the following description of the invention, pointed out in particularity in the appended claims, and taken in connection with the accompanying drawings, in which:

FIG. 1 is a perspective view of the novel apparatus;
FIG. 2 is a detail view in perspective illustrating the approach of the carriage and fingers carried thereby to the tape held at one end of the device;
FIG. 3 is a detail view similar to FIG. 2 showing the fingers in open position;
FIG. 4 is a detail view similar to FIG. 3 showing the position of the fingers just before they grasp the tape;
FIG. 5 is a detail view similar to FIG. 4 showing the fingers in position in which they grasp the tape;
FIG. 6 is a detail view similar to FIG. 5 but showing the tape grasped between the fingers and the carriage as it begins its movement toward the opposite end of the device to pull the tape to the opposite end of the device;
FIG. 7 is a detail view showing the carriage as it approaches the tape release cam;
FIG. 8 is a detail view showing the position of the fingers after they have released the tape;
FIG. 9 is a detail view of the carriage and driving shaft therefor;
FIG. 10 is a detail view in perspective of the end of the device where the tape guide is located showing the sheets of film and the tape just prior to being spliced;
FIG. 11 is an enlarged perspective view of the guide and the fingers forming part thereof;
FIG. 12 is a cross-sectional view of the mounting of the cam which actuates the gripping fingers on this carriage when the latter approaches the guide;
FIG. 13 is a schematic view showing a mechanism for actuating the jaws to move them to open and closed position and for pivoting the entire device step by step; and
FIG. 14 is a cross-sectional view taken on line 14—14 of FIG. 13.

FIG. 1 of the drawing shows an adhesive tape 1 wound into a roll 1' mounted on a shaft 2 which is secured to a support 3 forming part of the frame of the device. The tape 1 passes over a power-driven roller 4 mounted on a shaft 5 also secured to support 3. The gears (not shown) for driving the shaft 5 are driven by shaft 6. A knurled contact roller 7 is positioned above roller 4. The roller 7 is mounted by pin 8 in a pivot frame 9 pivotally mounted on pin 10 extending from support 3. A tension spring 11 acting on frame 9 tends to hold the roller 7 away from roller 4.

A shaft 12 is journalled in supports 13 forming part of the frame of the device and is driven by gear 14. A cam 15 is secured to the shaft 12 and provided with a high spot 16. A cam lever 17 rides on cam 15. This cam lever is rigid with one end of a shaft 18 journalled in a support 19 secured to support 3. The other end of the shaft is rigidly secured to one end of a lever 20, the other end of which is pivoted to one end of a spring-tensioned rod 21 connected to pivot frame 9. Rotation of cam 15 causes a periodic rotation of the shaft 18 when the high point 16 actuates lever 17 which in turn causes a downward movement of rod 21 and roll 7 against the action of spring 11. The tape 1, after passing between rollers 4 and 7, passes under knurled idler roll 22 over metering arm 23, then to tape guide 24 and is there held until it is engaged by a carriage 25 by which the tape is pulled through the machine. The tape guide 24 is mounted on arm 26 secured to shaft 27 journalled in the supports 13. The tape guide 24 is positioned adjacent one end of the machine and provided with edges 28 which guide the tape to make a substantially U-turn to go around the corner of the machine. The far end of the guide 24 is provided with stationary fingers 29 cooperating with movable fingers 30 pivoted to the guide 24 by pin 31 and spring pressed to fingers 29 by spring 32 (FIG. 11).

The carriage 25 comprises a block 33 having a groove shaped as a mortise in the lower face thereof which slides on a guide rail 34 shaped as a tenon, the two forming a dovetail joint. The rail 34 is supported on a bar 35 extending substantially the full length of the machine and carried by arms 36, one positioned at each end of the machine, which arms are mounted on shaft 27. Another bar 37 is positioned parallel to and normally spaced from bar 35. Bar 37 is carried by arms 38 mounted on a shaft 39 also journalled in supports 13 and extending parallel to shaft 27. The arms 36 and 38 are geared together at 40 to move in opposite directions, thereby moving bars 35 and 37 toward and away from each other upon rotation of shaft 39. The bars 35 and 37 function in the manner of jaws to press the tape against the adjacent edges of two sheets.

Secured to block 33 by screws 41 is a plate 42 having fingers 43 extending downwardly therefrom at one side thereof. The plate 42 is formed with a slideway 44 on the upper side thereof, in which slideway is positioned a plate 45 for sliding movement therein. The plate 45 has fingers 46 extending downwardly therefrom at one side thereof adjacent fingers 43. Sliding movement of plate 45 causes fingers 46 to move toward and away from fingers 43 to grip and release the tape. A spring 47 attached at one end to plate 45 and at the other end to a hook 48 projecting from block 33 (FIG. 9), maintains the plate 45 in slideway 44 and the fingers in position to grip the tape. Attached to the block 33 on the side thereof opposite to that where the fingers 43 and 46 are located, by means of screws 49, is a band 50. The band 50 is arcuate in shape and fits around a helical worm shaft 51 journalled in arms 36. The band 50 on the side thereof which is against the shaft is provided with a projection 52 which fits into the helical grooves of shaft 51. Rotation of shaft 51 causes carriage 25 to move along rail 34 from one end of the machine to the other and then back again. A cam stud 53 is secured to the top of plate 45.

A spring-loaded pin 54 is secured at 54' to shaft 27 adjacent the end thereof nearest the guide 24. The pin 54 carries a cam 55 which extends into the path of movement of cam stud 53. As the carriage 25 moves along rail 34 toward guide 24, cam 55 contacts cam stud 53 moving fingers 46 away from fingers 43 as shown in FIGS. 3 and 4 enabling the end of the tape held in place by fingers 29 and 30 to be positioned between the fingers 43 and 46 and when the cam stud 53 rides off cam 55, as shown in FIG. 5, spring 47 causes fingers 43 and 46 to grip the end of the tape. Due to the spring mounting of cam 55 (FIG. 12), this cam is capable of yielding and, upon return movement of the carriage 25, the cam stud 53 pushes cam 55 aside as shown in FIG. 6 and the end of the tape remains gripped by fingers 43 and 46 and pulled along bar 35 as these fingers move away from fingers 29 and 30.

Pinned to shaft 27 at 56 adjacent its end furthest away from guide 24 is another cam 57 which is also positioned in the path of movement of cam stud 53. This cam 57 contacts cam stud 53 as the carriage approaches the end of its movement in said direction and separates fingers 43 and 46, thereby releasing the end of the tape. The separation of the fingers 43 and 46 is aided by element 58 attached to the underside of plate 45.

A hopper 59 having slots in the top thereof and which may be of the type shown in the aforementioned application Serial No. 762,514 is positioned below the machine. The hopper contains a plurality of individual sheets or strips of film 60 which are to be spliced together. To remove the sheets or strips from the hopper and to position two of these sheets or strips in the machine with their edges adjacent each other and the tape, there is mounted on shaft 12 a cam 61 having a high point 62. A cam lever 63 resiliently connected to the upper end of an arm 64 by a pivot pin 65 and spring 66 rides on cam 61 and a similar lever 63' connected to arm 64' rides on cam 61'. The arms 64 and 64' are pivotally mounted on shaft 6. The lower end of arm 64 carries a gear train 67, the uppermost gear of which meshes with gear 68 on shaft 6. The arm 64 has an inwardly extending horizontal section which carries a horizontally disposed series of gears constituting a portion of the gear train 67 as shown in FIG. 1. The innermost of this series of gears drives a roller 69 and 69' formed of resilient material, such as rubber for example. The hopper 59 has openings 70 therein in alignment with roller 69 whereby the roller may be pushed into the hopper by the action of cam 61 lever 63 and arm 64 and the roller rotated, while in the hopper, by the gear train 67 to push the sheet of film upwardly through the slot in the top of the hoper and into a position adjacent the tape. The lever 63 is maintained against cam 61 by spring 71.

A knife 72 is secured to bar 37 adjacent the end thereof nearest the guide 24 by a screw 72' and the bar 35 at a point directly opposite the knife is provided with a groove 73 into which the knife is adapted to fit. Upon rotation of shaft 39 arms 36 and 38 are actuated to move bars 35 and 37 toward each other to press the tape against the adjacent edges of two sheets of film. At the same time, the tape is cut by knife 72 adjacent the fingers 29—30 of guide 24. Rotation of shaft 27 causes arm 26 to move the guide 24 away outwardly from bar 36 by pin 31 riding on cam 74 which is mounted on frame 13 by screws 75.

Guide elements 76 and 77 are disposed near the bottom and top of the machine to guide sheets or strips 60 as they emerge from the hopper 59.

In operation, a roll of tape 1' is placed on shaft 2 and the tape 1 is passed over driven roller 4, then under idler roller 22 over metering arm 23 and then to guide 24 where it is positioned and held in place between fingers 29 and 30, as shown in FIG. 2. Rotation of helical worm shaft 51 slides carriage 25 and fingers 43 and 46 carried thereby on rail 34 and when the carriage reaches the vicinity of guide 24, fingers 43 and 46 are opened by the action of cam 55 on cam stud 53 and the end of the tape 1 is positioned between the fingers 43 and 46 after which the cam stud 53 rides off cam 55 as shown in FIG. 5 and the tape 1 is gripped between these fingers. The carriage then begins its return movement toward the opposite end of the machine as shown in FIG. 6 pulling adhesive tape 1 with it. The movement of the tape is facilitated by rotation of roller 4 and the action of knurled roller 7 which contacts the adhesive side of the tape and renders the tape less adhesive thereby minimizing its tendency to stick to the portions of the device with which it comes in contact.

Due to the spring mounting of cam 55, this cam is pushed aside when cam stud 53 contacts it on the return movement and the fingers 43 and 46 remain closed to continue gripping the tape. As the carriage approaches the end of the device furthest from guide 24, high point 62 of cam 61 comes in contact with lever 63 and pushes roller 69 into hopper 59 into contact with a sheet of film 60 and the rotation of this roller pushes the sheet upwardly. When the adjacent edges of two sheets are in position adjacent the tape, as shown in FIG. 10, rotary movement is imparted to shaft 39 which causes a movement of arms 36 and 38 and bars 35 and 37 toward each other whereby the tape is cut by knife 72 and the tape and adjacent edges of two sheets of film 60 are pressed together by the bars acting as jaws. Just prior to the actuation of the jaws 35—37, the cam stud 53 comes in contact with cam 57 and fingers 43 and 46 are separated, thereby releasing the tape. After the two sheets of film are thus spliced together, rotation of the shaft 39 in the opposite direction causes a separation of the bars 35 and 37, thereby completing a cycle of the device. The cycle of operations, as described above, is then repeated.

The hopper disclosed in the aforementioned application Serial No. 762,514 moves step by step in an arc. In order for the device of this invention to cooperate with the moving hopper, similar step by step arcuate movement must be imparted to this device. For the purpose of imparting this stepwise arcuate movement, there is provided a shaft 78 having a bevel gear 79 on the ends thereof, one of which is shown in FIG. 13. The bevel gears mesh with bevel gears 80 secured to helical gears 81 journalled in the frame 13. Gears 81 mesh with sector gears 82 rigid with a support 83 upon which the device as a whole is pivotally mounted by means of shaft 12. Shaft 78 carries a bushing 84 which has a projection thereon. Shaft 39 has a bushing 86 pinned thereto which has a projection 87 thereon. A lever 88 is pivoted at one end to projection 87. As shown in FIG. 14, the portion of shaft 78 within the bushing 84 is provided with grooves 89 in which are located balls 90. The arrangement of these parts are such that the bushing moves freely relative to the shaft 78 when rotary movement is imparted to the bushing in one direction, but is clutched to the shaft 78, thereby causing rotary movement of the shaft when the bushing rotates in the opposite direction. A solenoid 91 is connected to bushing 84 to impart rotary movement thereto. Lever 88 connects bushing 84 to shaft 39 to cause this shaft to oscillate back and forth thereby actuating arms 36 and 38 to open and close jaws 35—37. Rotation of shaft 78 in one direction causes a step by step rotation of helical gear 81 meshing with stationary sector gear 82 and a stepwise pivoting of the entire device in one direction about shaft 12 as an axis.

The usual gears and motors (not shown) are provided for rotating shafts 6, 12 and 51.

While my novel device has been described in connection with its use for splicing photographic film, it is not so limited, but the device may be used to splice any type of sheet material. My invention is also not limited to the detailed description contained herein, but includes all modifications that fall within the scope of the appended claims.

I claim:
1. In an apparatus for splicing film, the combination comprising an elongated frame, means for supporting a roll of adhesive tape on the frame, a roller on the frame for pulling the tape from the roll, a guide means at the end of the frame for guiding the tape around a corner of the frame, holding means on the guide means for holding the tape in position, two parallel shafts extending longitudinally of and journalled in the frame, a supporting arm mounted at each end of each shaft, the two arms at one end of the two shafts being geared together to move in unison upon rotation of one of the shafts, two parallel bars supported by said arms for movement toward and away from each other, a third shaft extending parallel to said two shafts and journalled in the two arms at the ends of one of the two shafts, said third shaft having a helical groove in its surface extending substantially the full length thereof, a carriage mounted for sliding movement on the bar which is mounted on the same pair of arms as the third shaft, means on the carriage cooperating with the groove in the third shaft, whereby rotation of said last mentioned shaft causes the carriage to slide along the bar, back and forth from one end of the bar to the other, a pair of fingers attached to the carriage and movable therewith, one of said fingers being rigid with the carriage and the other finger being slidable relative to the one finger and carriage, means for urging the two fingers together, a cam positioned at each end of the shaft carrying the arms supporting said third shaft and means carried by said slidable finger adapted to cooperate with said cams to move said slidable finger to separate the fingers when the carriage reaches the end of its movement in either direction and means for rotating one of said two shafts to move the bars toward and away from each other.

2. An apparatus as recited in claim 1 wherein one of said bars is provided with a knife at the end thereof nearest the guiding means and the other bar is provided with a groove opposite said knife, whereby upon movement of the bars toward each other, the knife fits into said groove and cuts the tape adjacent said guiding means.

3. An apparatus for pulling adhesive tape off a roll thereof comprising a fixed support adapted to support a roll of tape for rotation thereon, guide means for guiding the tape as it leaves the roll, a supporting bar, a guide rail on said bar, a carriage slidable on said guide rail, gripping means for said tape mounted on said carriage, said gripping means comprising fingers rigidly secured to said carriage and extending downwardly therefrom on one side thereof adjacent the bar, a plate slidably mounted on the carriage and having fingers extending downwardly therefrom alongside and coextensive with the first mentioned fingers, means for normally maintaining the fingers in gripping relation to each other to grip the tape between them, means for moving the carriage to and away from said guide means and means fixed adjacent each end of the bar for slidably moving the plate, thereby to move the fingers carried thereby away from the fingers rigidly secured to the carriage, whereby the fingers grip the tape during movement of the carriage from one end of the bar to the other and are spread adjacent each end of the bar to receive the tape at one end of the bar and to release the tape at the other end of the bar.

4. An apparatus as recited in claim 3 wherein the means for sliding the plate comprises cams extending into the path of movement of the carriage.

5. An apparatus as recited in claim 4 wherein the cam positioned adjacent the end of the bar nearest the guide means is spring mounted and the plate has a projection positioned to contact the cam whereby, upon movement of the carriage toward the guide means, the cam contacts the projection and actuates the plate to spread the fingers and, upon continued movement of the carriage in the same direction, the projection is moved away from the cam to permit the fingers to grip the tape and, upon movement of the carriage in the opposite direction, the cam is pushed aside by said projection without separation of the fingers taking place.

References Cited in the file of this patent
UNITED STATES PATENTS

| | | |
|---|---|---|
| 1,217,252 | Williamson | Feb. 27, 1917 |
| 1,693,728 | Rainsford | Dec. 4, 1928 |
| 1,901,832 | Milmoe | Mar. 14, 1933 |
| 1,919,238 | McCarthy | July 25, 1933 |
| 2,565,009 | Wallingsford | Aug. 21, 1951 |
| 2,660,221 | Simpson | Nov. 24, 1953 |
| 2,746,543 | Gezich | May 22, 1956 |
| 2,754,117 | Ghormley | July 19, 1956 |
| 2,787,465 | La Motte | Apr. 2, 1957 |
| 2,827,104 | Rives | Mar. 18, 1958 |
| 2,865,154 | Coyne | Dec. 23, 1958 |
| 2,930,427 | Fillmann et al. | Mar. 29, 1960 |
| 2,988,129 | Kevelin | June 13, 1961 |